O. JACOBSEN.
HYDRAULIC THRUST BEARING.
APPLICATION FILED AUG. 6, 1913.
1,157,873.
Patented Oct. 26, 1915.
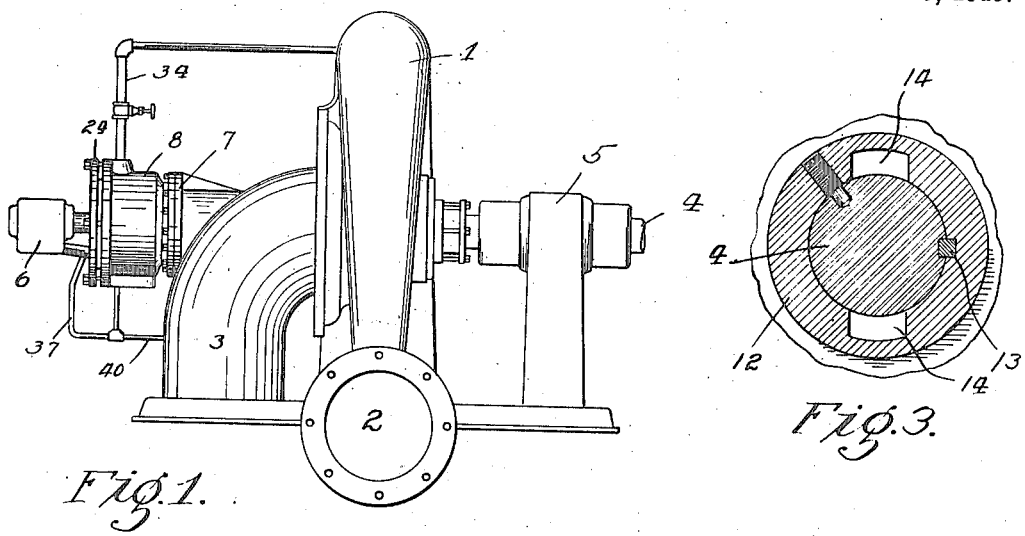
Fig. 1.
Fig. 3.
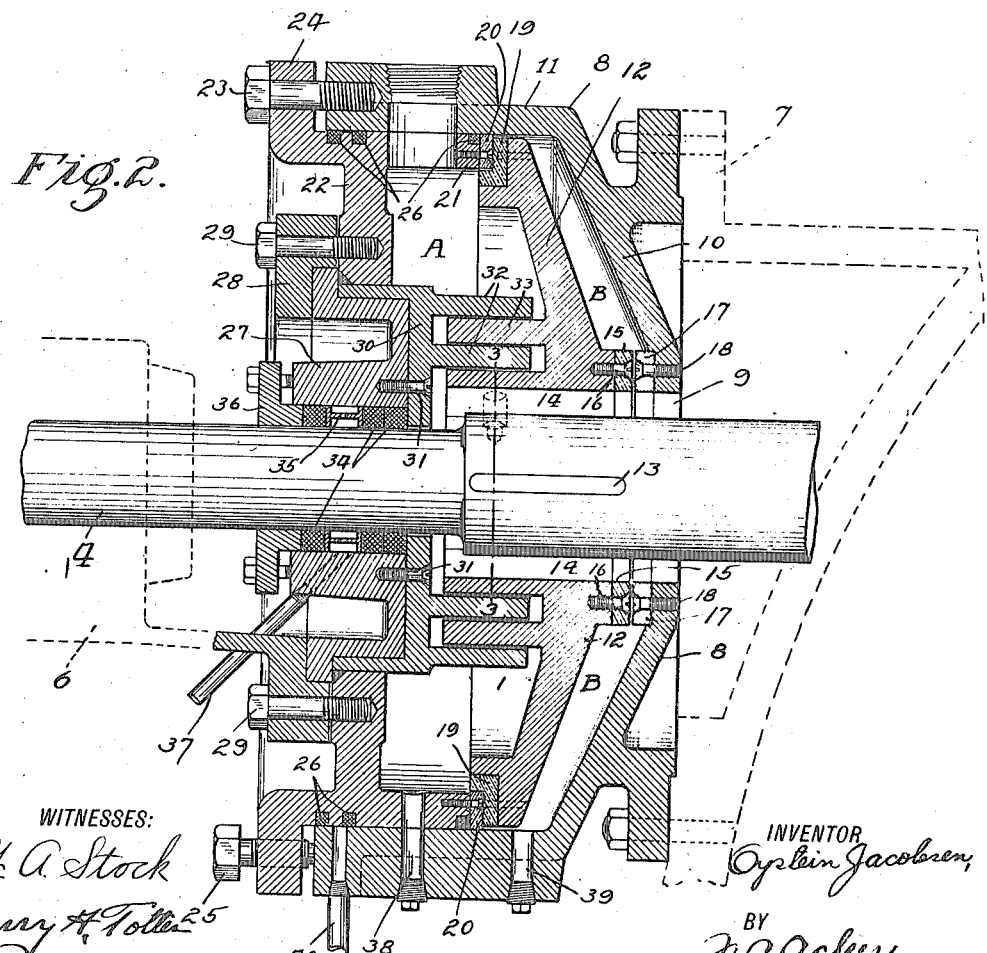
Fig. 2.
WITNESSES:
O. A. Stock
Harry A. Tolles
INVENTOR
Ophein Jacobsen
BY
H. A. Acker
his ATTORNEY

UNITED STATES PATENT OFFICE.

OYSTEIN JACOBSEN, OF SAN FRANCISCO, CALIFORNIA, ASSIGNOR TO THE PELTON WATER WHEEL COMPANY, OF SAN FRANCISCO, CALIFORNIA, A CORPORATION OF CALIFORNIA.

HYDRAULIC THRUST-BEARING.

1,157,873.  Specification of Letters Patent.  Patented Oct. 26, 1915.

Application filed August 6, 1913. Serial No. 783,283.

*To all whom it may concern:*

Be it known that I, OYSTEIN JACOBSEN, a citizen of the United States, residing in the city and county of San Francisco and State of California, have invented certain new and useful Improvements in Hydraulic Thrust-Bearings, of which the following is a specification.

The present invention relates to improvements in thrust bearings adapted for employment where thrust bearings are generally used, but more particularly designed for use in connection with hydraulic motors and rotary impact water wheels, to compensate or equalize the end thrust of the wheel supporting shaft, caused by the sudden changes of pressure in the wheel casing, and the action of said pressures on the wheel, and the invention has for its principal objects to provide a fluid controlled thrust bearing formed with a floating member having pressure chambers on both sides thereof and the retaining of pressure in said chambers being controlled by the position of said floating member; to provide a structure wherein the pressure equalizing fluid is returned to a common outlet, and to provide a structure having removable wearing surfaces which will permit of the replacement of a friction surface when the same becomes worn without renewing a portion of the structure carrying the friction surface, to provide a bearing which is thoroughly efficient for the purposes designed and one which may be easily and quickly assembled or taken down in order to renew or replace any worn parts.

With the above mentioned and other objects in view, the invention consists in the novel construction and combination of parts hereinafter described, illustrated in the accompanying drawings and more particularly pointed out in the claims hereto appended; it being understood that various changes in the form, proportion, size and minor details of construction within the scope of the claims, may be resorted to without departing from the spirit or sacrificing any of the advantages of the invention.

To more fully comprehend the invention, reference should be had to the accompanying drawings wherein is disclosed one form of my invention, and in which—

Figure 1 is a view in elevation of a water wheel with my invention mounted on the casing thereof. Fig. 2 is a vertical sectional view of my improved bearing, disclosing the construction and arrangement of the various parts thereof. Fig. 3 is a broken sectional view taken on line 3—3 Fig. 2, disclosing the passage around the shaft to the casing outlet.

Referring more particularly to the figures of the drawings, wherein like characters of reference designate corresponding parts throughout the several views, the reference numeral 1 designates a suitable water wheel casing provided with the water inlet 2 and outlet 3, and in which is rotatably mounted a motor shaft 4, carried by suitable supporting bearings 5 and 6.

Extending outwardly from the surface of the outlet pipe 3 is a suitable annular flange 7, to the peripheral edge of which is bolted an annular shell 8, which encircles the shaft 4 and which is formed with an enlarged central bore 9, through which said shaft extends, the shell being formed with an outwardly flared interior end wall 10 and an overhanging annular end flange 11.

A circular disk 12 is mounted within the shell 8 and is secured to the shaft to be rotated thereby by a key 13, and said disk is formed adjacent said shaft with the cut out portions or channels 14 which communicate with the enlarged bore 9 of the shell 8. A suitable wear ring 15 is detachably secured to the inner hub portion of the disk 12 by the screws 16, and the same operates against a corresponding wear ring 17 detachably secured to the hub portion of the shell 8 by the screws 18; said rings when the same become worn may be readily replaced.

The peripheral edge of the disk 12 carries a detachable wear ring 19, substantially L-shaped in cross section, and said ring operates against a suitable detachably mounted annular wear ring 20, carried on the inner annular flanged surface 21 of a circular head 22, which fits within the shell 8, and is secured to the annular end flange 11 thereof by the threaded screws 23 which project through openings in the flange 24, formed on the head 22, the head being adjustable relative to the shell 8 by the adjusting screws 25. It will be apparent that by adjusting the head, as in Fig. 2 of the drawings, to permit the longitudinal thrust of the shaft 4 to move the disk 12 a slight distance between the wear rings 17 and 20, that a small passage is provided between the wear rings 19 and 20 on the thrust of the shaft in one direction, and a passage between the wear rings 15 and 17 is formed on the thrust of the shaft in the opposite direction.

Suitable packing rings 26 are carried by the flange 21 of the head 22 and the same maintain a tight joint between the flange 21 and the flange 11 of the shell 8.

A removable closure plug 27 closes an annular centrally arranged opening in the head 22, and the same is detachably retained in position by a retaining ring 28 which is secured to the head 22 by the bolts 29 and said ring in turn supports the bearing 6, as in Fig. 1 of the drawings.

A suitable plate 30 is detachably secured to the inner surface of the closure plug 27 by the screws 31, and the same is provided with parallel spaced outwardly projecting flanges 32, between which is received an annular flange 33 projecting outwardly from the outer surface of the disk 12, and said interlocking flanges provide a fluid retarding means, the purpose of which is hereinafter more fully described.

A valve controlled communication 34 extends from the casing 1 to the pressure chamber A, which is provided between the head 22 and the disk 12, and admits water thereinto under substantially the same pressure as is present in the casing, the excess water passes around the ends of the flanges 32 and 33 and is drawn into the outlet 3 through the cut out portions or bores 14, by the suction or vacuum formed therein by the passage of the water through the outlet 3. A suitable packing gland formed of the packing rings 34 and the lantern gland 35 surrounds the end of the shaft 4, and is retained in position in the closure plug 27 by the adjusting member 36, the excess water flowing in the lantern gland being drawn off through a valve controlled connection 37 which extends from a communication 40, and the fluid entering the lantern gland from around the shaft forms a water seal and prevents the drawing in of any air around the shaft on the creation of a vacuum within the shell 8.

Suitable valve controlled drain openings 38 and 39 are formed in the lower portion of the flange 11 to permit the drawing off of the fluid from the interior of the shell when it is desired, and an outlet 40 is also provided in the flange 11 adjacent its outer edge; which permits the passage of any seepage water from between the flanges 11 and 21 to return to the casing outlet 3.

On the water under great head pressure entering the casing inlet opening 2 to rotate the wheel, not shown, which is supported on the shaft 4, and passing outwardly from the casing through the outlet 3, there is considerable end thrust movement of the shaft 4, caused by the variation of pressure in the casing and the difference in vacuum formed in the outlet 3, and assuming that the end thrust of the shaft 4 has forced the wear rings 19 and 20 into their engaged position, as in Fig. 2 of the drawings, and that water under pressure is admitted from the casing 1, through the communication 34 into the chamber A, the thrust bearing operates in the following manner. The water under pressure in the chamber A passes around the ends of the flanges 32 and 33 which materially reduces the force or pressure thereof and passes or is drawn into the outlet 3 through the openings 14. The water in the chamber A also exerts pressure on the disk 12 and gradually forces the same inwardly against the pressure of the end thrust on the shaft 4, and the inward movement of the disk separates the ring 19 from ring 20 providing an annular passage between the same, through which the water rushes from the pressure chamber A to the counter pressure chamber B. The movement of the disk having forced the rings 15 and 17 closer together prevents the ready escape of the water from the counter pressure chamber B to the opening 9 and into the outlet 3. As the pressure accumulates in the counter pressure accumulating chamber B, the disk 12, owing to the greater area thereof exposed to the pressure in the counter pressure accumulating chamber B, will be forced outwardly slightly separating the wear ring 15 from the ring 17 and permitting the escape of a portion of the fluid from the chamber B through the passage 9 which will reduce the pressure in the counter chamber B and as this pressure is reduced the water under pressure in the chamber A will be forced between the rings 19 and 20 and compensate for the loss. It will be apparent that by maintaining a constant supply under pressure in the chamber A, that on the inward thrust of the shaft 4 or the inward movement of the disk by the accumulation of pressure in the chamber A, the water under pressure immediately passes into the chamber B and owing to the greater surface of the disk 12 exposed to the pressure in the chamber B, the accumulation of pressure in the chamber B forces the disk toward the chamber A, but as it does the rings 15 and 17 are separated which permits the escape of the pressure from the chamber B to the bore 9, and on any reduction of pressure in the chamber B, the above equalization of pressures from chamber A to B takes place.

The disk 12 at all times floating between the pressures in the chamber A and that in chamber B, it will be apparent that by providing a structure of this type, the end thrust of the shaft will be taken care of at all times as the disk 12 is a substantially floating bearing held in suspension between two pressures, one on either side thereof, and slightly variable in accordance with the direction of end thrust of the shaft.

In the construction as above described, I have provided a bearing which will equalize or reduce the end thrust of shafts, and have provided one which may be readily taken down and assembled when it is desired to renew or replace worn parts thereof, and which is so constructed as to return the pressure fluid to the outlet of the wheel casing and prevent the leakage of the fluid from the casing.

Having thus described my invention what I claim as new and desire to protect by Letters Patent is:—

1. In a thrust bearing for hydraulic motors or similar structures and in combination with the rotary shaft thereof, the same comprising a fixed casing into which said shaft extends and said casing provided with interiorly arranged opposing annular bearing surfaces, a disk rotatably carried by said shaft and positioned between said bearing surfaces and dividing said casing into a plurality of pressure chambers, said disk being capable of movement with said shaft on the end thrust thereof toward the bearing surface in the direction of the thrust and provided with annular bearing surfaces arranged in coöperative relation with said first mentioned bearing surfaces, a normally open fluid supply opening leading to one of said chambers for admitting fluid thereto under pressure, and a normally open restricted fluid outlet from said chamber to permit a circulation of fluid through said chamber, said disk controlling the admittance of the fluid under pressure from said first mentioned chamber to the other of said chambers and the escape of the fluid from the latter chamber.

2. In a thrust bearing for hydraulic motors or similar structures and in combination with the rotary shaft thereof, the same comprising a fixed casing into which said shaft extends, a disk rotatably carried by said shaft in said casing and positioned in coöperative relation between opposing annular bearing surfaces formed in said casing and dividing said casing into a plurality of pressure chambers, said disk capable of movement with said shaft on the end thrust thereof toward the shoulder in the direction of the thrust, a normally open fluid supply opening leading to one of said chambers for admitting a fluid thereto under pressure, and a normally open restricted fluid outlet passage from said chamber to permit a circulation of fluid through said chamber, said disk controlling the admittance of the fluid under pressure from the first mentioned chamber to the other of said chambers and the escape of the fluid from the latter chamber.

3. In a thrust bearing for hydraulic motors or similar structures and in combination with the rotary shaft thereof, the same comprising a fixed casing into which said shaft extends, a disk rotatably carried by said shaft and positioned in said casing in coöperative relation between opposing bearing surfaces formed in said casing and dividing the same into a plurality of pressure chambers, one on each side of said disk and one having a greater surface of said disk exposed therein than the other, said disk capable of movement with said shaft on the end thrust thereof toward the bearing surface in the direction of the thrust, a normally open fluid supply opening leading into the chamber in which the smaller area of said disk is exposed for admitting a fluid thereinto under pressure, a normally open restricted fluid outlet passage from said chamber to permit circulation of fluid through said chamber, and said disk controlling the admittance of the fluid under pressure from the chamber in which the smaller area thereof is exposed into the other chamber, and the escape of the fluid from the latter chamber.

4. In a thrust bearing for hydraulic motors or like structures and in combination with the rotary shaft thereof, the same comprising a fixed shell open at its outer end and provided at its opposite end with an enlarged opening into which said shaft extends, an annular stationary bearing surface formed on the interior surface of said shell and surrounding said enlarged opening, a flanged closure fitted within the outer open end of said shell, the inner end of said flange providing a stationary annular bearing surface, a disk rotatably carried by said shaft and positioned in said shell between said stationary bearing surfaces and provided on its opposite faces with bearing surfaces adapted to coöperate with said stationary bearing surfaces, said disk dividing the interior of said shell into a plurality of pressure chambers arranged one on either side thereof and capable of movement with said shaft on the end thrust thereof toward the stationary bearing surface in the direction of the thrust, an outlet channel formed in the hub of said disk and communicating with said enlarged opening, a normally open fluid supply opening leading into one of said chambers for admitting a fluid thereinto under pressure, and a restricted fluid outlet leading from said chamber into said outlet channel, said disk controlling the admittance of the fluid under pressure from the fluid inlet chamber to the other of said chambers and the escape of the fluid from the latter chamber into the enlarged opening.

5. In a thrust bearing for hydraulic motors or like structures and in combination with the rotary shaft thereof, the same comprising a fixed shell open at its outer end and provided at its opposite end with an enlarged fluid outlet opening through which said shaft extends, an annular stationary bearing surface detachably secured to the interior of said shell and surrounding said enlarged opening, a flanged closure adjustably fitted within the outer open end of said shell, an annular stationary bearing surface detachably secured to said flange, a disk rotatably carried by said shaft and positioned in said shell between said stationary bearing surfaces, annular bearing surfaces detachably secured to the opposite faces of said disk in coöperative relation with said stationary bearing surfaces, said disk dividing the interior of said shell into a plurality of pressure chambers arranged one on either side thereof and capable of movement with said shaft on the end thrust thereof toward the stationary bearing surface in the direction of the thrust, an outlet channel formed in the hub of said disk and communicating with said enlarged opening, a fluid supply opening leading into one of said chambers for admitting a fluid thereto under pressure, and a contracted fluid outlet leading from said chamber into said outlet channel.

6. In a thrust bearing for hydraulic motors or similar structures and in combination with the rotary shaft thereof, the same comprising a fixed casing into which said shaft extends, spaced annular bearing surfaces detachably secured within said casing, a disk rotatably carried by said shaft and provided with bearing surfaces in movable relation with the first named bearing surfaces and dividing said casing into a plurality of pressure chambers, said disk being capable of movement with said shaft on the end thrust thereof toward the bearing surface in the direction of the thrust, annular bearing surfaces detachably secured to said disk in coöperative relation with said first mentioned bearing surfaces, a normally open fluid supply opening leading into one of said chambers for admitting fluid thereto under pressure, and a contracted fluid outlet from said chamber, said disk controlling the admittance of the fluid under pressure from said first mentioned chamber to the other of said chambers and the escape of the fluid from the latter chamber.

7. In a thrust bearing for hydraulic motors or similar structures, the same comprising a motor housing, a motor shaft rotatably mounted in said housing, a fluid inlet and outlet for said housing, a shell supported by said fluid outlet and provided with an enlarged opening communicating with the interior of said outlet and through which said shaft extends, an annular stationary bearing surface formed on the interior of said shell and surrounding said enlarged opening, a flanged closure fitted within the outer open end of said shell, the inner end of said flange providing a stationary annular bearing surface, a disk rotatably carried by said shaft and positioned in said shell between said stationary bearing surfaces and provided on its opposite faces with annular bearing surfaces adapted to coöperate with said stationary bearing surfaces, said disk dividing the interior of said shell into a plurality of pressure chambers arranged one on either side thereof and capable of movement with said shaft on the end thrust thereof toward the stationary bearing surface in the direction of the thrust, an outlet channel formed in the hub of said disk and communicating with the fluid outlet through said enlarged bore, a fluid supply leading from said casing to one of said chambers for admitting a fluid thereto under pressure, and a contracted fluid outlet leading from said chamber and communicating with said outlet channel, said disk controlling the admittance of the fluid under pressure from the fluid inlet chamber into the other of said chambers and the escape of the fluid from the latter chamber into the casing fluid outlet.

8. In a thrust bearing for hydraulic motors or like structures, and in combination with the rotary shaft thereof, the same comprising a fixed shell open at its outer end and provided with an opening through which said shaft extends, said shell being formed with a fluid outlet opening adjacent said shaft, a bearing surface secured to said shell adjacent the first mentioned opening, a flanged closure fitted within the open end of said shell and carrying on its flange a bearing surface, a disk keyed to said shaft and positioned in said shell between said bearing surfaces, bearing surfaces carried by the opposite faces of said disk in coöperative relation with said first mentioned bearing surfaces, said disk dividing the interior of said shell into a plurality of pressure chambers arranged one on either side thereof, and capable of movement with said shaft toward the bearing surface in the direction of the thrust, a fluid escape channel formed in said hub and communicating with said first mentioned fluid outlet, coöperating means carried by said disk and said closure and providing a contracted fluid outlet from one of said chambers, and a fluid supply opening leading to said chamber for the contracted outlet, the lateral movement of said disk controlling the admittance of the fluid under pressure from said first mentioned chamber to the other of said chambers and the escape of the fluid from the latter chamber.

9. A thrust bearing for hydraulic motors or similar structures, in combination with a rotary shaft thereof, the same comprising a fixed casing into which said shaft extends, the said casing provided with interiorly arranged annular bearing surfaces, a removable plate secured to the casing having a series of spaced annular flanges projecting within the casing, a disk rotatably carried by said shaft and positioned between said bearing surfaces and dividing the casing into a plurality of chambers, a spaced flange projecting from said disk and adapted to intermesh with the projecting flanges from the plate, said disk being capable of movement with said shaft on an end thrust thereof toward the bearing surface in the direction of the thrust and provided with annular bearing surfaces arranged in coöperative relation with the first mentioned bearing surface, and a normally opened fluid supply leading to one of said chambers for admitting fluid thereto under pressure, and a fluid outlet from said chamber, said disk controlling the admittance of fluid under pressure from said first mentioned chamber to the other of said chambers and the escape of the fluid from the latter chamber.

In testimony whereof I have signed my name to this specification in the presence of two subscribing witnesses.

OYSTEIN JACOBSEN.

Witnesses:
HARRY A. TOTTEN,
D. B. RICHARDS.